(12) United States Patent
Ahn et al.

(10) Patent No.: US 8,895,180 B2
(45) Date of Patent: Nov. 25, 2014

(54) LITHIUM POLYMER SECONDARY BATTERY WITH EXTERNAL WRAPPING MEMBER

(75) Inventors: Changbum Ahn, Yongin-si (KR); Kyugil Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 467 days.

(21) Appl. No.: 12/901,310

(22) Filed: Oct. 8, 2010

(65) Prior Publication Data
US 2011/0117399 A1   May 19, 2011

(30) Foreign Application Priority Data
Nov. 16, 2009  (KR) .................. 10-2009-0110520

(51) Int. Cl.
*H01M 2/02* (2006.01)
*H01M 10/42* (2006.01)
*H01M 10/0525* (2010.01)
*H01M 2/36* (2006.01)

(52) U.S. Cl.
CPC ........ *H01M 10/0525* (2013.01); *H01M 10/425* (2013.01); *H01M 2/0212* (2013.01); *H01M 2/0275* (2013.01); *H01M 2/0267* (2013.01); *H01M 2/361* (2013.01); *Y02E 60/122* (2013.01); *H01M 2/021* (2013.01)
USPC ............ 429/167; 429/164; 429/176; 429/180

(58) Field of Classification Search
USPC .................................. 429/164, 167, 176, 180
See application file for complete search history.

(56) References Cited

U.S. PATENT DOCUMENTS

| 6,083,640 | A | * | 7/2000 | Lee et al. ................. 429/94 |
| 6,743,546 | B1 | | 6/2004 | Kaneda et al. |
| 2001/0038938 | A1 | | 11/2001 | Takahashi et al. |
| 2005/0118501 | A1 | * | 6/2005 | Hashimoto et al. .......... 429/180 |
| 2006/0210870 | A1 | | 9/2006 | Moon et al. |
| 2006/0216591 | A1 | * | 9/2006 | Lee ............................. 429/175 |
| 2006/0246349 | A1 | | 11/2006 | Uh |
| 2007/0128513 | A1 | | 6/2007 | Hatta et al. |
| 2007/0154794 | A1 | | 7/2007 | Kim et al. |
| 2007/0224499 | A1 | | 9/2007 | Kodama et al. |
| 2007/0287063 | A1 | * | 12/2007 | Hiratsuka et al. ............ 429/177 |
| 2008/0152631 | A1 | * | 6/2008 | Sugiyama ................. 424/93.21 |
| 2008/0299451 | A1 | | 12/2008 | Funahashi et al. |

(Continued)

FOREIGN PATENT DOCUMENTS

CN        1841835 A        10/2006
CN        1992381 A         7/2007

(Continued)

OTHER PUBLICATIONS

Japanese Patent Office Action dated Sep. 18, 2012 to Japanese Patent Application No. 2010144715 (5 pages).

(Continued)

*Primary Examiner* — Zachary Best
(74) *Attorney, Agent, or Firm* — Christie, Parker & Hale, LLP

(57) ABSTRACT

A secondary battery includes an electrode assembly comprising a first electrode, a second electrode, and a separator between the first electrode and the second electrode; an external member wrapped around a side surface of the electrode assembly; a cover coupled to the external member; and a terminal protection member between the electrode assembly and the cover.

22 Claims, 4 Drawing Sheets

(56) References Cited

U.S. PATENT DOCUMENTS

| | | |
|---|---|---|
| 2009/0098416 A1 | 4/2009 | Hatta et al. |
| 2010/0196745 A1 | 8/2010 | Ahn et al. |
| 2011/0111265 A1 | 5/2011 | Jang |

FOREIGN PATENT DOCUMENTS

| | | |
|---|---|---|
| CN | 101267032 A | 9/2008 |
| EP | 1708295 | 10/2006 |
| EP | 1970722 | 9/2008 |
| EP | 2063474 | 5/2009 |
| JP | 08-329972 | 12/1996 |
| JP | 10-112296 | 4/1998 |
| JP | 11-016546 | 1/1999 |
| JP | 2003303580 A * | 10/2003 |
| JP | 2003-331799 | 11/2003 |
| JP | 2004-022208 A | 1/2004 |
| JP | 2006-278331 A | 10/2006 |
| JP | 2006-310268 A | 11/2006 |
| JP | 2008-159559 | 7/2008 |
| JP | 2008-300144 | 12/2008 |
| KR | 10-2004-0005022 A | 1/2004 |
| KR | 10-2007-0038113 A | 4/2004 |
| KR | 10-2007-0058351 | 6/2007 |
| KR | 10-2010-0090141 | 8/2010 |
| WO | WO 2008/078948 A1 | 7/2008 |
| WO | WO 00/59063 A1 | 10/2012 |

OTHER PUBLICATIONS

KIPO Office action dated Jul. 28, 2011 in priority Korean application No. 10-2009-0110520, 8 shts.

EP Search Report in the name of Samsung SDI Co., Ltd. dated Mar. 2, 2011; EP Appln. No. 10191329.1, 6 pgs.

SIPO Office action dated Jul. 8, 2013, with English translation, for corresponding Chinese Patent application 201010549636.3, (13 pages).

English machine translation of Japanese Publication 08-329972 listed above, (23 pages).

English machine translation of Japanese Publication 10-112296 listed above, (13 pages).

English machine translation of Japanese Publication 11-016546 listed above, (11 pages).

U.S. Office action dated Apr. 1, 2013, for cross reference U.S. Appl. No. 12/698,346, (14 pages).

U.S. Office action dated Apr. 21, 2014, for cross reference U.S. Appl. No. 12/698,346, (14 pages).

KIPO Office action dated Aug. 18, 2010, for Korean Patent application 10-2009-0009451, (5 pages).

Japanese Office action dated Jan. 15, 2013, for Japanese Patent application 2010-144715, (2 pages).

SIPO Office action dated Feb. 5, 2013 for Chinese Patent application 201010549636.3, with English translation, (12 pages).

U.S. Office action dated Oct. 5, 2012, for cross reference U.S. Appl. No. 12/698,346, (23 pages).

English machine translation of Japanese Publication 08-329972 listed above, (23 pages)(Dec. 1996).

English machine translation of Japanese Publication 10-112296 listed above, (13 pages)(Apr. 1998).

English machine translation of Japanese Publication 11-016546 listed above, (11 pages)(Jan. 1999).

* cited by examiner

LITHIUM POLYMER SECONDARY BATTERY WITH EXTERNAL WRAPPING MEMBER

CROSS-REFERENCE TO RELATED APPLICATION

This application claims priority to and the benefit of Korean Patent Application No. 10-2009-0110520, filed on Nov. 16, 2009, the entire content of which is incorporated herein by reference.

BACKGROUND

1. Field

Embodiments relate to a secondary battery, and more particularly, to a secondary battery.

2. Description of the Related Art

In general, a secondary battery is typically formed by storing an electrode assembly and electrolyte in a pouch type external case. In this case, the electrode assembly often includes a positive electrode plate, a negative electrode plate, and a separator located between the electrode plates.

Such a secondary battery usually does not include a structure for protecting electrode terminals, and thus, is susceptible to external mechanical shock.

Specifically, a high capacity secondary battery includes a stack type or wound type electrode assembly that have a plurality of unit batteries and a plurality of separators. Since a plurality of electrode tabs extend from the high capacity secondary battery, if the electrode tabs are moved, a short circuit may be generated.

Furthermore, when a high capacity battery is charged or discharged, intense heat is generated from an electrode terminal by electrode tabs of an electrode assembly. Thus, the battery might spark or explode due to the intense heat.

SUMMARY

According to an aspect of the present invention, a secondary battery is provided, wherein the battery is protected from external mechanical shock.

According to another aspect of the present invention, a high capacity secondary battery is provided that prevents movement of an electrode terminal including electrode tabs, so as to prevent a short circuit due to movement of the electrode tabs.

According to yet another aspect of the present invention, a high capacity secondary battery is provided that prevents sparking and explosion of the battery due to heat generated from an electrode terminal including electrode tabs.

In one embodiment, a secondary battery is provided including an electrode assembly having a first electrode, a second electrode, and a separator between the first electrode and the second electrode; an external member wrapped around a side surface of the electrode assembly; a cover coupled to the external member; and a terminal protection member between the electrode assembly and the cover.

In one embodiment, the terminal protection member has a size and a shape generally corresponding to an edge of the electrode assembly. Additionally, the terminal protection member may include a flat part and an outer wall connected to the flat part, and the outer wall may have a terminal opening through which the electrode terminal protrudes.

In one embodiment, the terminal protection member is made from an insulating material such as polypropylene or polyethylene, and may be coupled to an inner surface of the external member, such as by press-fitting.

In one embodiment, a secondary protective device is between the terminal protection member and the cover and is electrically connected to the electrode assembly. The secondary protective device may include a thermal fuse. Additionally, a circuit board including a protective circuit may be on the terminal protection member.

In one embodiment, the external member includes a gas chamber to which gas generated during charging and discharging is discharged, and wherein the gas chamber has a side through which electrolyte is injected.

BRIEF DESCRIPTION OF THE DRAWINGS

The above and other features and aspects will become more apparent to those of ordinary skill in the art by the following detailed description of exemplary embodiments with reference to the attached drawings, in which.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
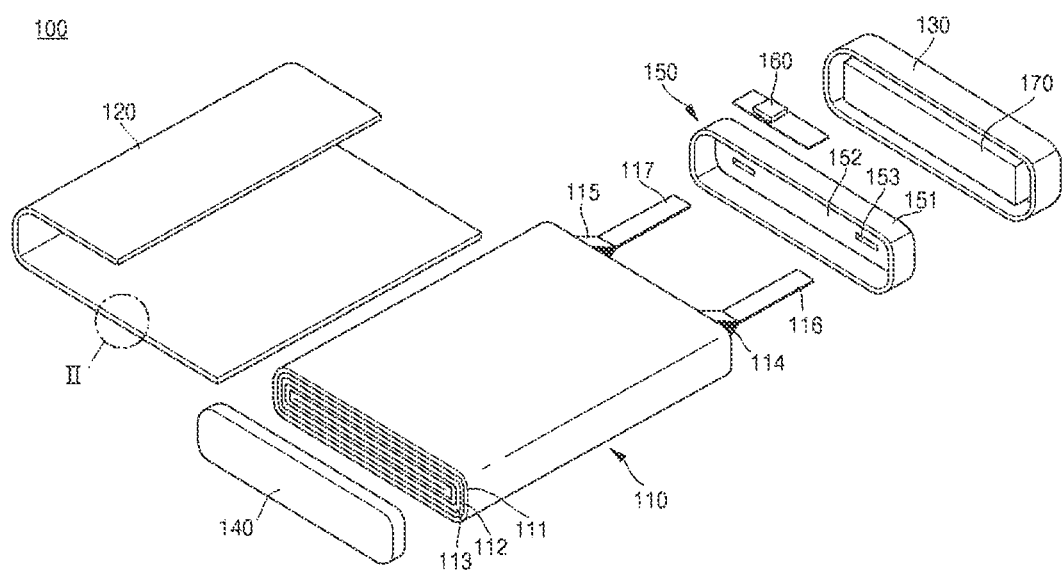
FIG. 1 is an exploded perspective view illustrating a secondary battery according to an embodiment.
Figure 2:
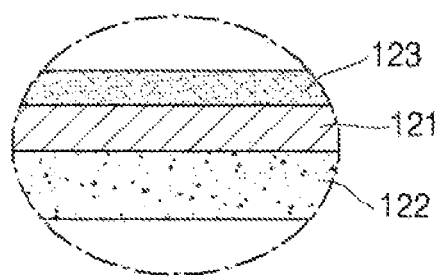
FIG. 2 is an enlarged view illustrating portion II of FIG. 1.
Figure 3:
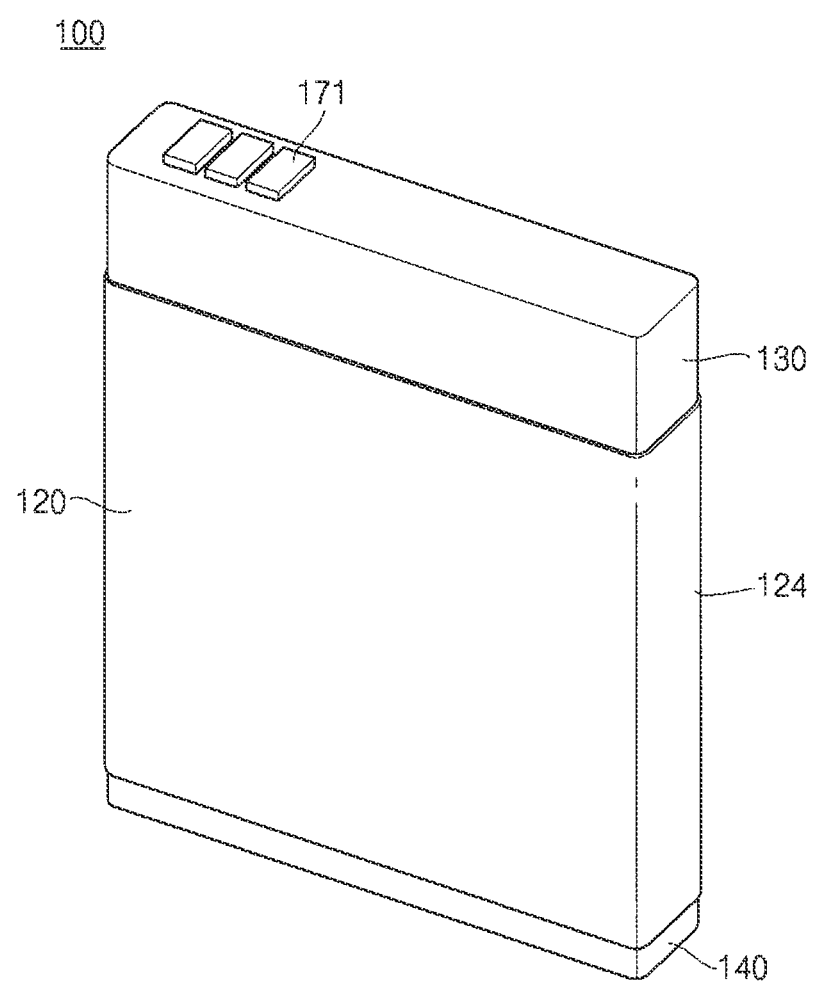
FIG. 3 is a perspective view illustrating an assembled secondary battery of FIG. 1.
Figure 4:
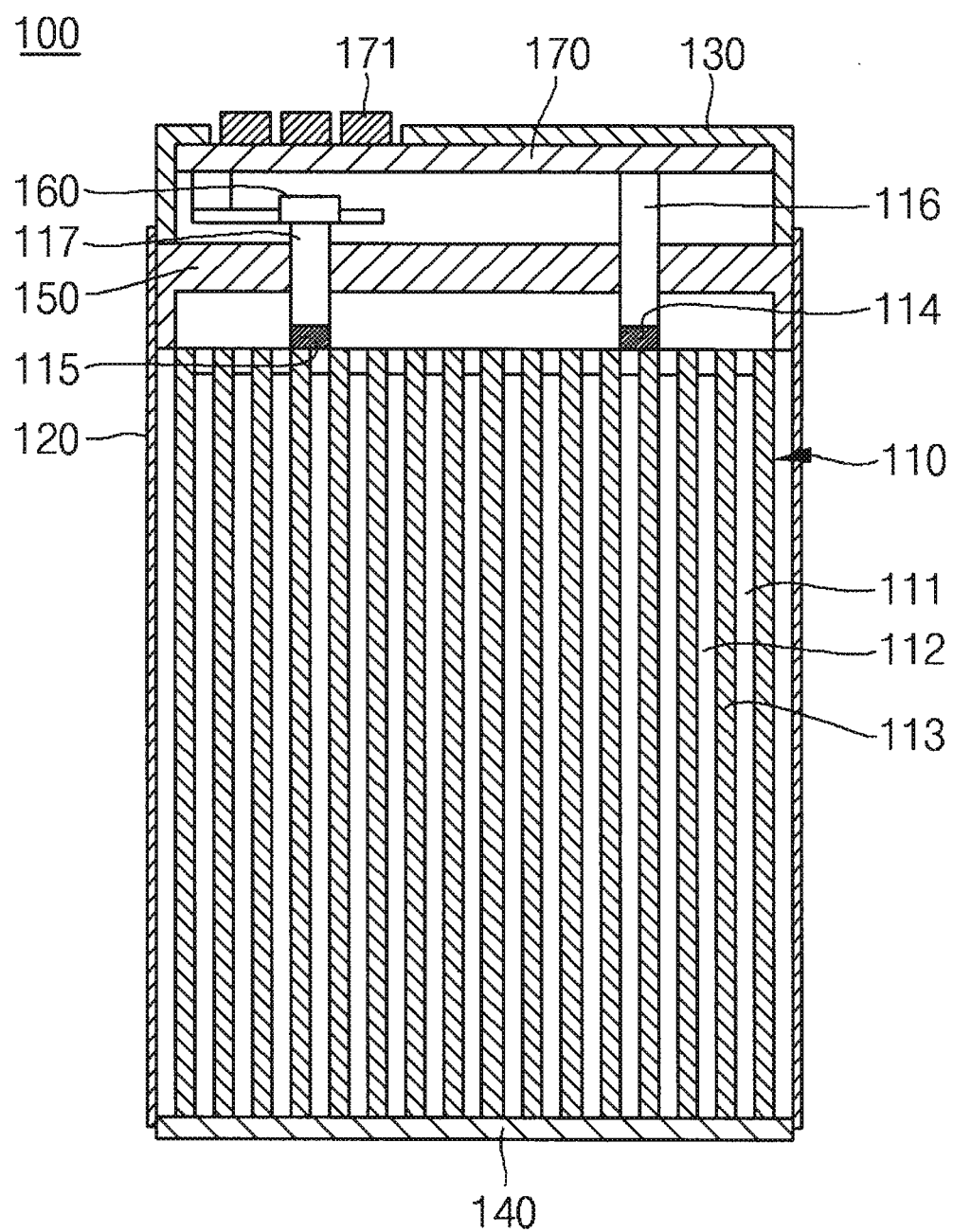
FIG. 4 is a cross-sectional view of FIG. 3.
Figure 5:
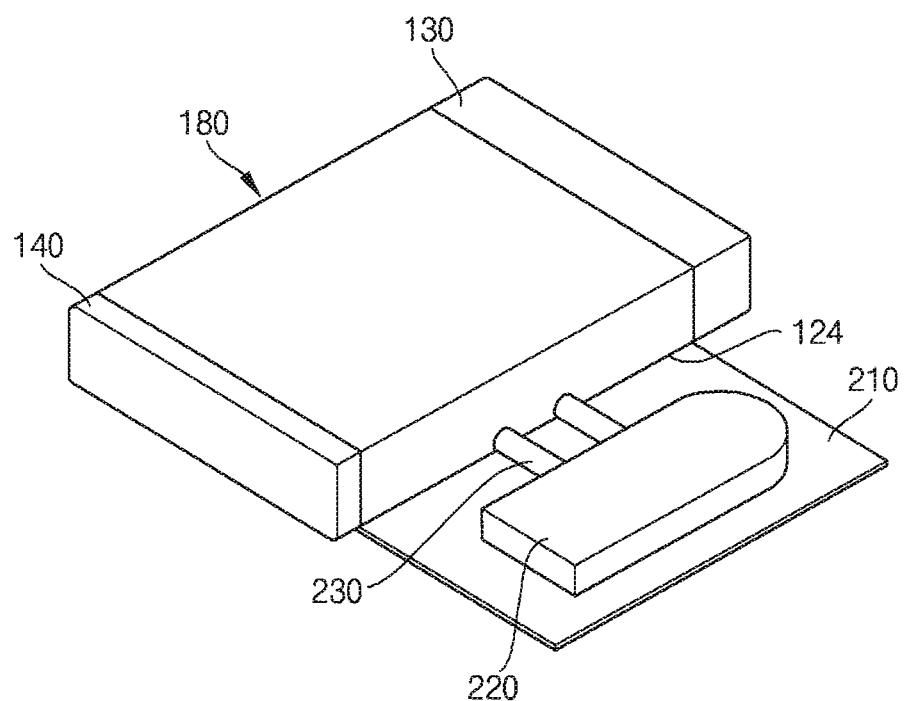
FIG. 5 is a perspective view illustrating the secondary battery of FIG. 1 including a gas chamber.

FIG. 1 is an exploded perspective view illustrating a secondary battery according to an embodiment. FIG. 2 is an enlarged view illustrating portion II of FIG. 1. FIG. 3 is a perspective view illustrating an assembled secondary battery of FIG. 1. FIG. 4 is a cross-sectional view of FIG. 3. FIG. 5 is a perspective view illustrating the secondary battery including a gas chamber.

Referring to FIGS. 1 through 4, a secondary battery 100 includes an electrode assembly 110 including a first electrode 111 and a second electrode 112 to which a plurality of electrode tabs 114 and 115 having different polarities to deliver a current to the outside are respectively attached, and a separator 113 located between the first and second electrodes 111 and 112; an external member 120 surrounding the electrode assembly 110; and first and second covers 130 and 140 welded, e.g., through heat welding to a respective first and second end of the external member 120. The electrode assembly 110 is formed by sequentially stacking the first electrode 111, the separator 113, and the second electrode 112 or by winding them in a jelly roll shape. For example, the secondary battery may be a lithium polymer secondary battery.

A terminal protection member 150 is installed between the electrode assembly 110 and the first cover 130, and a secondary protective device 160 is installed between the terminal protection member 150 and the first cover 130. A circuit board 170 is installed on the upper side of the terminal protection member 150.

The first electrode 111 of the electrode assembly 110 may be a positive electrode plate, and the second electrode 112 may be a negative electrode plate. However, the polarity of the electrode plates may be reversed.

The positive electrode plate 111 includes a positive electrode collector and a positive electrode coated portion located on the positive electrode collector. An end or edge portion of the positive electrode collector is provided with a positive electrode uncoated portion. The electrode tabs 114, which are electrode tabs of the first electrode 111, are attached to the positive electrode uncoated portion. Thus, the electrode tabs 114 are electrically connected to an external circuit such that electrons collected in the positive electrode collector flow to the external circuit. In one embodiment, the positive electrode collector and the electrode tabs 114 are formed of aluminum (Al) that has high electrical conductivity. The electrode tabs 114 may be attached to the positive electrode uncoated portion through supersonic welding, for example. The positive electrode coated portion is formed by mixing lithium metal oxide such as lithium cobalt oxide ($LiCoO_2$) with conductive material and a binder for inserting and extracting lithium ions. After the electrode tabs 114 are welded to the positive electrode uncoated portion, a tape is attached to the electrode tabs 114 to prevent detachment of the electrode tabs 114.

The negative electrode plate 112 includes a negative electrode collector collecting electrons generated through a chemical reaction, and a negative electrode coated portion located on the upper portion of the negative electrode collector. An end of the negative electrode collector is provided with a negative electrode uncoated portion. The electrode tabs 115, which are electrode tabs of the second electrode 112, are attached to the negative electrode uncoated portion. Thus, the electrode tabs 114 are electrically connected to an external circuit such that electrons collected in the negative electrode collector flow to the external circuit. A tape is attached to the electrode tabs 115 to prevent the electrode tabs 115 from being detached from the negative electrode uncoated portion. The negative electrode collector may be formed of copper (Cu) or nickel (Ni) that has high electrical conductivity. The electrode tabs 115 may be formed of nickel (Ni). The negative electrode coated portion is formed by mixing carbon material with conductive material and a binder for inserting and extracting lithium ions.

The positive electrode tabs 114 attached to the positive electrode plate 111 are welded to a first electrode terminal 116. The negative electrode tabs 115 attached to the negative electrode plate 112 are welded to a second electrode terminal 117.

The external member 120 wraps around or surrounds side surfaces of the wound electrode assembly 110. The wound electrode assembly 110 is compressed on both sides to have a generally rectangular parallelepiped shape. In this case, the external member 120 wraps around large side surfaces of the electrode assembly 110. The electrode assembly 110 and electrolyte are stored inside the external member 120. Two surfaces or sides of the external member 120 are welded together, e.g., through heating welding to form a sealing part 124. A side of the sealing part 124 may be provided with a gas chamber through which the electrolyte is injected and gas generated during charging/discharging is discharged. A structure of the gas chamber will be described in more detail in a description of a fabrication method to be described later.

The external member 120 is composed of a laminate film with an substantially rectangular shape. The laminate film has a thickness ranging from about 170 μm to about 300 μm. Thus, the laminate film has high strength with a high shock resistance property to protect an electrode assembly and prevent leakage of electrolyte. When the thickness of the laminate film is less than 170 μm, it is difficult to provide sufficient shock resistance. When the thickness of the laminate film is greater than 300 μm, it is difficult to increase the capacity of a battery relative to a metal can type external member.

The external member 120 includes a shield layer 121, an outer layer 122 located on a first surface of the shield layer 121, and an inner layer 123 located on a second surface of the shield layer 121.

The shield layer 121 may be formed of metal that may be at least one of iron (Fe), nickel (Ni), and aluminum (Al). The metal of the shield layer 121 has high mechanical strength and high corrosion resistance. Thus, mechanical strength of the external member 120, and corrosion resistance of the external member 120 against electrolyte are improved. The metal of the shield layer 121 may have an elongation ranging from about 20% to about 60%. Accordingly, the shield layer 121 may have a thickness ranging from about 20 μm to about 150 μm.

The outer layer 122 is located on the outer surface of the external member 120, and may be one of nylon and polyethylene terephthalate (PET) having high tensile strength, high shock strength, and high durability. The outer layer 122 may be formed on the outer surface of the shield layer 121 at high temperature in a laminate manner. The outer layer 122 may have a thickness ranging from about 5 μm to about 30 μm. Polyethylene terephthalate (PET) may constitute an alloy film. An adhesive component may not be included in polyethylene terephthalate (PET). In this case, adhesive is applied on a surface of the shield layer 121, and then, polyethylene terephthalate (PET) is attached to the surface.

The inner layer 123 is located on the inner surface of the external member 120. The inner layer 123 may be formed of modified polypropylene (CPP). The inner layer may have a thickness ranging from about 30 μm to about 150 μm.

The first cover 130 is coupled to the electrode assembly 110 at a position where the first electrode terminal 116 connected to the positive electrode tabs 114 and the second electrode terminal 117 connected to the negative electrode tabs 115 extend through the first cover. The first cover 130 has an substantially rectangular parallelepiped shape with an open surface defining a cavity, and a size substantially corresponding to the electrode assembly 110. That is, the first cover 130 has a cap shape having an inner surface. The first cover 130 may be formed of one of polypropylene (PP) and polyethylene (PE), but the present disclosure is not limited thereto.

The second cover 140 is coupled to the electrode assembly 110 at a position without the first and second electrode terminals 116 and 117. The second cover 140 may have a rectangular parallelepiped cap shape generally corresponding to the size of the electrode assembly 110. Alternatively, the second cover 140 may have a plate shape. The second cover 140 may be formed of one of polypropylene (PP) and polyethylene (PE), but the present disclosure is not limited thereto.

The terminal protection member 150 protects the positive electrode tabs 114, the negative electrode tabs 115, and the first and second electrode terminals 116 and 117 connected to the positive electrode tabs 114 and the negative electrode tabs 115, respectively.

The terminal protection member 150 has a size and a shape generally corresponding to a cross section of the electrode assembly 110. That is, the terminal protection member 150 may include an outer wall with a size generally corresponding to an edge of the electrode assembly 110. However, it will be appreciated that the terminal protection member 150 may have a size, and particularly a width that is less than or greater than a width of the electrode assembly 110.

Alternatively, the terminal protection member 150 may include a vertical part (an outer wall 151), and a horizontal part (a flat part 152) connected to the outer wall 151. The flat part 152 is provided with terminal openings 153 through which the first and second electrode terminals 116 and 117 pass. The terminal protection member 150 is formed of insulating material such as polypropylene (PP) or polyethylene (PE).

The terminal protection member 150 may be welded, e.g., through heat welding to the inner surface of the external member 120. In this case, the outer wall 151 of the terminal protection member 150 is welded, e.g., through heat welding to the inner surface of the external member 120. Thus, since the terminal protection member 150 is located between the electrode assembly 110 and the first cover 130, when the external member 120 is fixed to the terminal protection member 150, the external member 120 is fixed to the cell more stably.

Alternatively, the terminal protection member 150 does not need to be welded to the external member 120. In this case, the terminal protection member 150 may be coupled by press-fitting it to the electrode assembly 110 at the position where the first and second electrode terminals 116 and 117 extend. Furthermore, it will be appreciated that the terminal protection member 150 press-fit to the electrode assembly 110 can be welded, e.g., through heat welding to the external member 120.

Alternatively, the terminal protection member 150 may be placed on the upper surface of the electrode assembly 110 at the position where the first and second electrode terminals 116 and 117 extend.

The terminal protection member 150 may be welded, e.g., through heat welding to the first cover 130. That is, since the terminal protection member 150 and the first cover 130 are formed of material such as polypropylene (PP) or polyethylene (PE), they are easily welded, e.g., through heat welding to each other. Thus, the first cover 130 and the terminal protection member 150 are adapted to protect the first and second electrode terminals 116 and 117, the positive electrode tabs 114, and the negative electrode tabs 115 of the electrode assembly 110 from external shock.

A protective temperature coefficient (PTC) device or a thermal fuse may be used for the secondary protective device 160. In the current embodiment, a thermal fuse is used to cut off a current if the electrode assembly 110 overheats.

The circuit board 170 including a protective circuit is installed in the first cover 130. External terminals 171 are installed on a surface of the circuit board 170 to deliver a current transmitted through the first and second electrode terminals 116 and 117 of the electrode assembly 110 to the outside.

A method of fabricating the secondary battery configured as described above will now be described.

The positive electrode plate 111, the separator 113, and the second electrode 112 are sequentially stacked and wound to form the electrode assembly 110 in generally a jelly roll shape. Then, the positive electrode tabs 114 are attached to the uncoated portion of the positive electrode plate 111, and the negative electrode tabs 115 are attached to the uncoated portion of the negative electrode plate 112. The positive electrode tabs 114 are welded to the first electrode terminal 116, and the negative electrode tabs 115 are welded to the second electrode terminal 117.

The terminal protection member 150 is coupled to the upper end of the electrode assembly 110 where the first and second electrode terminals 116 and 117 extend through the terminal protection member. That is, the first and second electrode terminals 116 and 117 pass through the terminal openings 153 of the terminal protection member 150. At this point, the terminal protection member 150 may be press-fit to a side of the electrode assembly 110, or just placed on the side of the electrode assembly 110.

The terminal protection member 150 protects the first and second electrode terminals 116 and 117, the positive electrode tabs 114, and the negative electrode tabs 115 from external shock. Furthermore, the terminal protection member 150 prevents movement of the first and second electrode terminals 116 and 117.

The first electrode terminal 116 protruding from the terminal protection member 150 is electrically connected to an inner terminal having a first polarity in the circuit board 170. The second electrode terminal 117 passing through the terminal protection member 150 is electrically connected to the thermal fuse 160 functioning as a safety device. The thermal fuse 160 is electrically connected to an inner terminal having a second polarity in the circuit board 170.

The circuit board 170 is installed in the first cover 130, and the inner terminals of the circuit board 170 are electrically connected to the external terminals 171. The external terminals 171 protrude out of the first cover 130 to deliver a current from the battery to the outside.

Thus, the first cover 130 including the terminal protection member 150, the thermal fuse 160, and the circuit board 170 is coupled to the upper end of the electrode assembly 110. The second cover 140 is coupled to the lower end of the electrode assembly 110.

The external member 120 surrounds the side surface of the electrode assembly 110 and the side surfaces of the first and second covers 130 and 140, and two edges of the external member 120 overlap each other to form the sealing part 124. The upper end of the external member 120 is welded, e.g., thermally welded with the lower end of the first cover 130, and the lower end of the external member 120 is welded, e.g., thermally welded with the upper end of the second cover 140. The first and second covers 130 and 140 are formed of polypropylene, and the inner surface of the external member 120 is formed of modified polypropylene (CPP). Thus, the external member 120 and the first and second covers 130 and 140 are formed of a substantially identical material to secure an effective adhesive condition.

In addition, the external member 120 may be welded, e.g., thermally welded, to the outer surface of the vertical part 151 constituting the outer wall of the terminal protection member 150.

In the current embodiment, a separate gas chamber may be provided to inject electrolyte to the inside of the external member 120.

Referring to FIG. 5, a gas chamber 220 is located on an extension part 210 extending from a side of the sealing part 124 at an electrode assembly storage space 180 of the external member 120. Electrolyte injection passages 230 are located to connect the electrode assembly storage space 180 to the gas chamber 220. Thus, electrolyte is injected into the electrode assembly storage space 180 through the gas chamber 220 and the electrolyte injection passages 230. During charging and discharging, gas generated in the electrode assembly storage space 180 is discharged to the gas chamber 220. When the charging and discharging are completed, the gas chamber 220 and the extension part 210 located around the gas chamber 220 are removed, and the sealing part 124 of the external member 120 is heated, compressed, and sealed to complete the fabrication of the battery.

According to embodiments, the battery protects the electrode assembly and the electrode terminals from external mechanical shock without using a separate external pack.

Additionally, according to embodiments, the electrode tabs are arrayed regularly, and movement of the electrode tabs are substantially prevented so as to prevent a short circuit in the battery, thus improving the reliability of the battery.

Further, according to embodiments, accidents such as explosion and sparking of the battery due to intense heat generated from the electrode tabs are substantially prevented.

Exemplary embodiments have been disclosed herein, and although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims.

What is claimed is:

1. A secondary battery comprising:
   an electrode assembly comprising a first electrode, a second electrode, and a separator between the first electrode and the second electrode;
   an external member wrapped around the electrode assembly, the external member comprising a laminate film having a substantially rectangular sheet shape and comprising an outer layer, a shield layer, and an inner layer stacked together, wherein the external member directly contacts the electrode assembly;
   a cover directly coupled to the external member;
   a circuit board comprising a protective circuit on the cover;
   a secondary protective device spaced from the circuit board and electrically coupled to one of the first electrode and the second electrode; and
   a terminal protection member directly contacting the electrode assembly and the cover,
   wherein the terminal protection member comprises a flat surface and an outer wall connected to the flat surface,
   wherein the outer wall extends towards the electrode assembly from the flat surface and is coupled to the electrode assembly.

2. The secondary battery as claimed in claim 1, wherein the terminal protection member has a size and a shape generally corresponding to an edge of the electrode assembly.

3. The secondary battery as claimed in claim 1, wherein the outer wall has a terminal opening through which an electrode terminal protrudes.

4. The secondary battery as claimed in claim 1, wherein the terminal protection member comprises an insulating material comprising polypropylene or polyethylene.

5. The secondary battery as claimed in claim 1, wherein the terminal protection member is coupled to an inner surface of the external member.

6. The secondary battery as claimed in claim 1, wherein the terminal protection member is separate from an inner surface of the external member.

7. The secondary battery as claimed in claim 1, wherein the terminal protection member is press-fit to the electrode assembly.

8. The secondary battery as claimed in claim 1, wherein the terminal protection member is on the electrode assembly.

9. The secondary battery as claimed in claim 1, wherein the terminal protection member is coupled to the cover.

10. The secondary battery as claimed in claim 1, wherein a secondary protective device is between the terminal protection member and the cover and is electrically connected to the electrode assembly.

11. The secondary battery as claimed in claim 1, wherein the secondary protective device comprises a thermal fuse.

12. The secondary battery as claimed in claim 1, wherein a circuit board comprising a protective circuit is on the terminal protection member.

13. The secondary battery as claimed in claim 1, wherein two surfaces of the external member are coupled together to form a sealing part.

14. The secondary battery as claimed in claim 1, wherein the external member comprises a gas chamber to which gas generated during charging and discharging is discharged, and wherein the gas chamber has a side through which electrolyte is injected.

15. The secondary battery as claimed in claim 1, wherein the external member has a thickness of between about 170 μm and about 300 μm.

16. The secondary battery as claimed in claim 1, wherein the cover comprises a first cover coupled to an upper end of the electrode assembly, and a second cover coupled to a lower end of the electrode assembly.

17. The secondary battery as claimed in claim 1, wherein the cover has an electrode tab storage space.

18. The secondary battery as claimed in claim 1, wherein the cover has a cap shape defining a cavity.

19. The secondary battery as claimed in claim 1, wherein the cover comprises polypropylene or polyethylene.

20. The secondary battery as claimed in claim 1, wherein the cover is welded to the external member.

21. The secondary battery as claimed in claim 20, wherein the welding is heat welding.

22. The secondary battery of claim 1, wherein a width of the terminal protection member is less than a width of the electrode assembly.

* * * * *